United States Patent [19]

Funane

[11] Patent Number: 4,770,302

[45] Date of Patent: Sep. 13, 1988

[54] CONVEYING APPARATUS

[75] Inventor: Kumi Funane, Yokohama, Japan

[73] Assignee: Kabushiki Kaisha Toshiba, Kawasaki, Japan

[21] Appl. No.: 25,767

[22] Filed: Mar. 13, 1987

[30] Foreign Application Priority Data

Mar. 19, 1986 [JP] Japan .................................. 61-59319
May 9, 1986 [JP] Japan ................................ 61-104728

[51] Int. Cl.$^4$ ............................................. B07C 5/16
[52] U.S. Cl. ........................................................ 209/592
[58] Field of Search ............... 209/592, 593, 594, 595, 209/596

[56] References Cited

U.S. PATENT DOCUMENTS

| | | | |
|---|---|---|---|
| 4,262,763 | 4/1981 | Raskin | 209/592 |
| 4,262,807 | 4/1981 | Leverett | 209/592 |
| 4,403,669 | 9/1983 | Raz | 209/592 |
| 4,478,302 | 10/1984 | Niederer | 209/592 |
| 4,586,613 | 5/1986 | Horii | 209/592 |
| 4,632,254 | 12/1986 | Scopatz | 209/592 |

FOREIGN PATENT DOCUMENTS 55-119616 9/1980 Japan .

Primary Examiner—Joseph F. Peters, Jr.
Assistant Examiner—Stephen P. Avila
Attorney, Agent, or Firm—Cushman, Darby & Cushman

[57] ABSTRACT

A conveying apparatus has a main conveying mechanism and a subsidiary conveying mechanism. The main conveying mechanism conveys a case having an object therein along a main conveying path. The subsidiary conveying mechanism conveys the case along a subsidiary conveying path extending from the main conveying onto the subsidiary conveying mechanism path. A case-supply portion, for supplying the case, is provided at an extending end of the subsidiary conveying path. A weight-detection mechanism is provided at the case-supply portion, for detecting the weight of the case supplied thereonto. The conveying of the case, by the main and subsidiary conveying mechanism, is controlled in accordance with a detection result of the weight-detection mechanism.

18 Claims, 7 Drawing Sheets

CONVEYING APPARATUS

BACKGROUND OF THE INVENTION

The present invention relates to a conveying apparatus used in a general hospital or the like.

Conventionally, in such establishments, various objects, for example, charts, X-ray film, slips, blood, or Ringer's solution are conveyed between a medical dep. and consultation rooms. An example of a conveying apparatus for the above purpose is disclosed in Japanese Patent Disclosure No. 55-119616. This particular apparatus detects the weight of the article and controls the conveying thereof, on the basis of its weight. In this apparatus, the relationship between the weight of the article and its conveying speed is experimentally determined beforehand. Then, immediately after the conveying operation has commenced, the actual conveying speed is measured. In this way, the weight of the article is determined, and, as a consequence, the amount of braking to be applied when the conveying of the article is to be stopped.

When an object is to be delivered by means of the above conveying apparatus, the weight of the object to be conveyed is detected on the basis of the moving speed of the apparatus, immediately after conveying has begun. When the weight of the object exceeds a range of conveyable weights, the conveying of the article may then be stopped, or, if conveying continues, the actual stopping position may deviate considerably from that desired, due to the braking force available being insufficient for the load being conveyed.

SUMMARY OF THE INVENTION

It is an object of the present invention to provide a conveying apparatus wherein unintended stopping or a deviation from the desired stopping position of an object being conveyed can be prevented.

According to an aspect of the present invention, there is provided a conveying apparatus which comprises means for conveying an object, means for detecting the weight of the object to be conveyed, means for transferring the object, whose weight has been detected by the weight-detection means, to the conveying means, and means for controlling the conveying means, in accordance with the detection of the weight-detection means.

According to the conveying apparatus of the present invention, the weight of an object is detected before conveying begins, and in accordance with the detection result, it is determined whether the article can be conveyed. Control of the conveying operation is then performed on the basis of the weight of the article to be conveyed. Therefore, the problems associated with the prior art device, i.e., unintended stopping of the conveying operation, and deviation from the desired stopping position, do not occur in the apparatus of the present invention.

DETAILED DESCRIPTION OF THE PREFERRED EMBODIMENT

Figure 1:
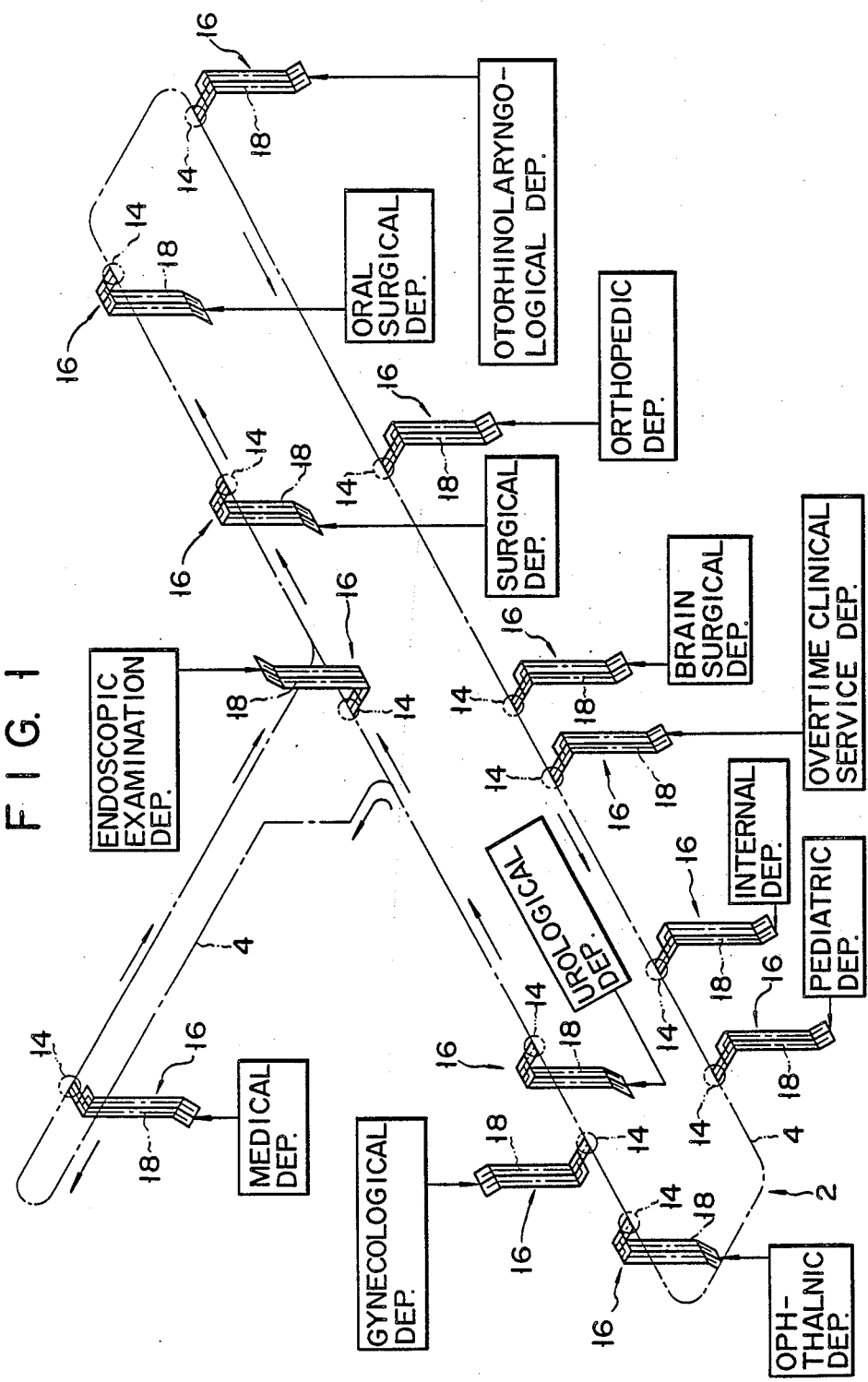
FIG. 1 is a schematic perspective view of an embodiment of the conveying apparatus according to the present invention.

In FIG. 1, reference numeral 2 denotes a main conveying mechanism which conveys case 6 (shown in FIG. 4) along main conveying path 4 consisting of a first main conveying path portion and a second main conveying path portion which branches from the middle of the first main conveying path portion, and joins with it again.

Figure 2:
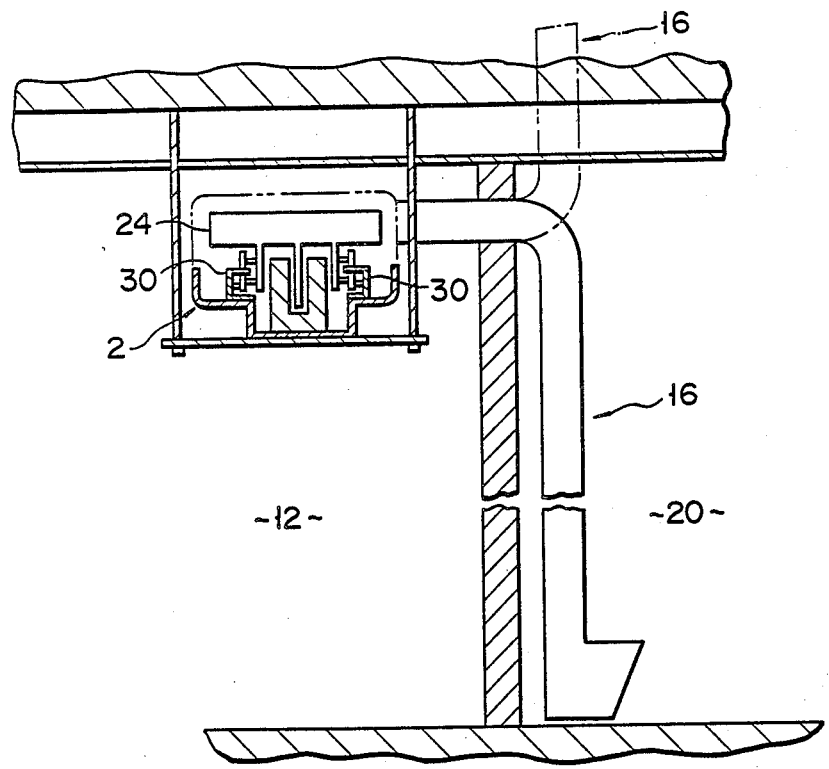
FIG. 2 is a schematic view showing a positional relationship between a main conveying mechanism and a subsidiary conveying mechanism of the same apparatus.

As is shown in FIG. 2, mechanism 2 is suspended from ceiling portion 12, so that path 4 is substantially horizontal. A plurality of stations 14 are provided on path 4, and spaced apart from each other.

Reference numeral 16 denotes a plurality of subsidiary conveying mechanisms which convey case 6 along a plurality of subsidiary conveying paths 18 extending from respective stations 14 arranged along the course of path 4. Each path 18 extends along an inner wall of each room 20, such as a medical dep., an endoscopic examination dep., an oral surgical dep., an otorhinolaryngological dep., an orthopedic dep., a surgical dep., a brain surgical dep., an overtime clinical service dep., an internal dep., a pediatric dep., an ophthalmic dep., a gynecological dep., and a urological dep. The extending end of each downwardly extending path 18 is positioned below a floor where path 4 is provided. The extending end of each upwardly extending path 18 is positioned at room 20, above the floor where path 4 is provided.

Figure 3:
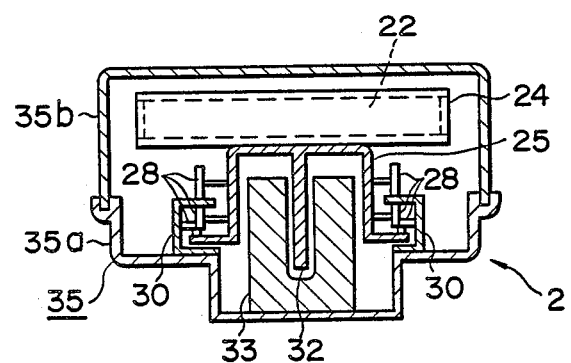
FIG. 3 is a schematic sectional view of the main conveying mechanism of the same apparatus.

Mechanism 2 has carrier 24 which includes case-storage portion 22, as is shown in FIG. 3. Carrier 24 is supported by support member 25 which includes a plurality of guide rollers 28. Rollers 28 run along a pair of guide rails 30. Consequently, carrier 24 can be moved conveying path along path 4.

Each carier 24 is provided with a reaction plate 32, which serves as a secondary conductor. Stators 33 serving as primary conductors are provided at predetermined intervals along path 4. Plate 32 and stators 33 together constitute a linear motor. Stators 33 are driven by a power source unit (not shown), and a magnetic flux, which varies over time, is applied to plate 32. By way of the variations in this magnetic flux, a constant propulsive or braking force is generated at plate 32, thereby moving or stopping carrier 24.

Note that reference numeral 35 denotes a casing which covers path 4. Casing 35 consists of lower case 35a and upper case 35b which is freely attached to and detached from lower case 35a, so as to facilitate inspection or maintenance.

A stator 33 is provided at each station 14 arranged along path 4. Carrier 24 is stopped at station 14, when required. A case-transfer mechanism 26 is provided at each station 14. Case 6 is transferred between mechanisms 2 and 16, by means of mechanism 26. That is, a case 6 containing an object such as a chart, a slip, blood, Ringer's solution, or other articles, or an empty case 6 from which the objects have been removed is transferred automatically.

Mechanism 26 has guide shaft 28. Shaft 28 is provided to be perpendicular to the moving direction of carrier 24 on path 4. Movable member 32 with push plate 30 is slidably mounted on shaft 28. Member 32 is reciprocated by a drive mechanism (not shown), whereby member 32 is reciprocated, so that case 6 held in carrier 24 of mechanism 2 is pushed toward receiving/transferring portion 34, or, alternatively, case 6 at receiving/transferring portion 34 is transferred into carrier 24. Carrier 24 is provided with a case-securing mechanism (not shown) for securing case 6 housed in case-storage portion 22. This mechanism prevents case 6 from falling out during conveyance.

Mechanism 16 has take-in conveying portion 36 and send-out conveying portion 38. Take-in conveying portion 36 conveys case 6 at receiving/transferring portion 34 (provided opposite station 14) to case-receiving portion 40 provided in room 20. Send-out conveying portion 38 conveys case 6 supplied to case-supply portion 42 (provided adjacent to case-receiving portion 40) to receiving/transferring portion 34.

Figure 5:
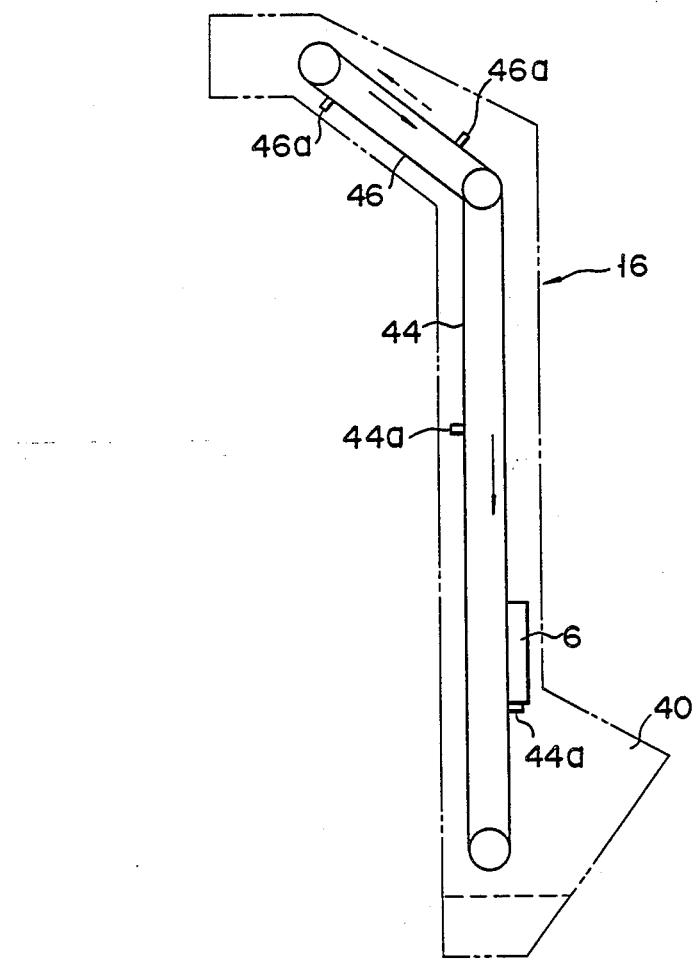
FIG. 5 is a schematic sectional view of an inner structure of a subsidiary conveying mechanism of the same apparatus.

As is shown in FIG. 5, take-in conveying portion 36 has a pair of vertical first pawled conveyor belts 44. A pair of inclined second pawled conveyor belts 46 extends from the upper end of belts 44.

Figure 6:
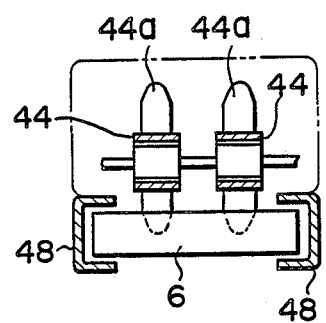
FIG. 6 is a cross-sectional view of part of the same mechanism.

A pair of case guides 48 (shown in FIG. 6) each having a U-shaped cross-section extend from the inclined lower end of belts 46 along belts 44. Both sides of case 6 are guided by guides 48.

Case 6 at receiving/transferring portion 34 is held at its rear end, with respect to its conveying direction, by pawls 46a when belt 46 moves along the direction indicated by a solid arrow in FIG. 5. Thus, case 6 is accurately guided by guides 48. The lower end of case 6 is supported by pawls 44a of belt 44. In this way, case 6 is moved downward along with belt 44, and is supplied, in an upright state, to case-receiving portion 40.

Figure 7:
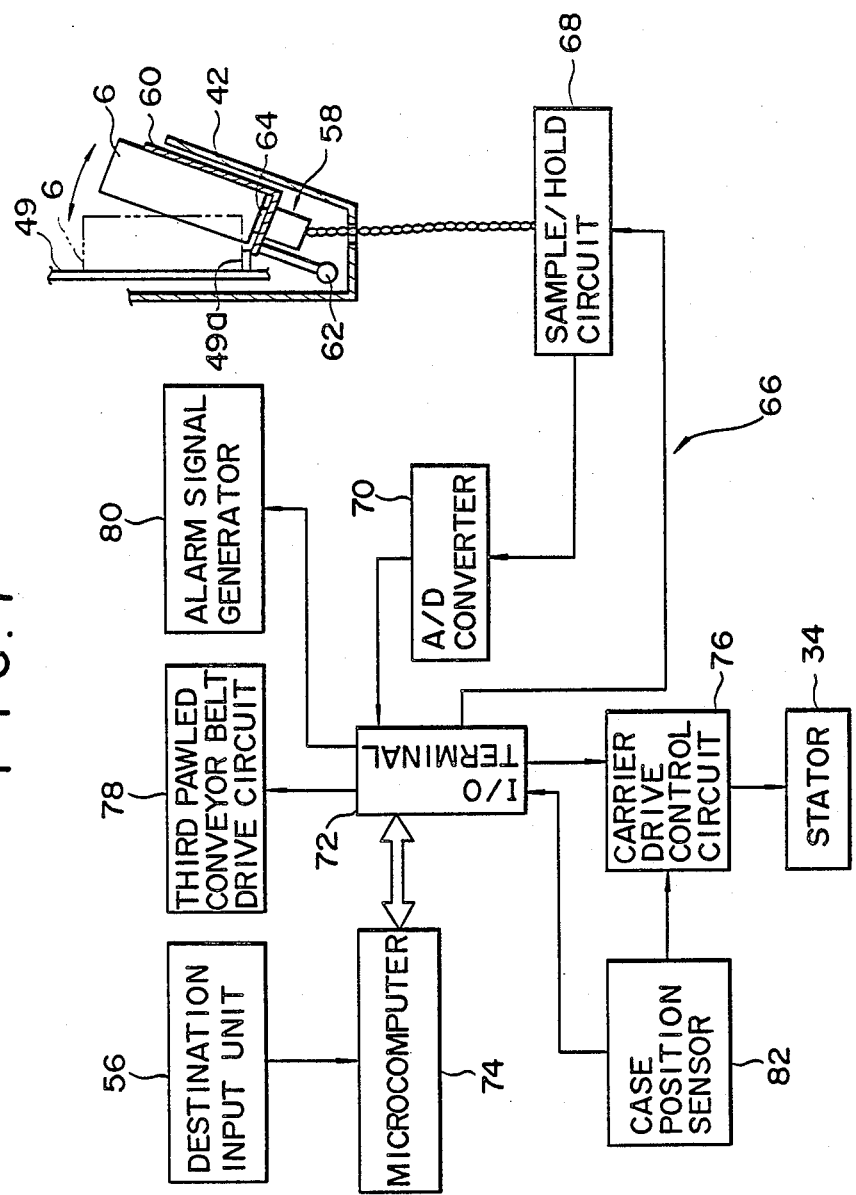
FIG. 7 is a schematic view of an arrangement of a weight-detection mechanism and a conveyance control unit of the same apparatus.

Send-out conveying portion 38 has a structure similar to that of take-in conveying portion 36, except that, in the case of portion 38, no member equivalent to belt 46 is provided, and belt 44 is replaced by third pawled conveyor belt 49 (shown in FIG. 7). In this case, belt 49 is moved in a direction opposite to that of belt 44. Case 6 supplied to case-supply portion 42 is lifted upward by pawls 49a of belt 49 when the latter moves.

Figure 4:
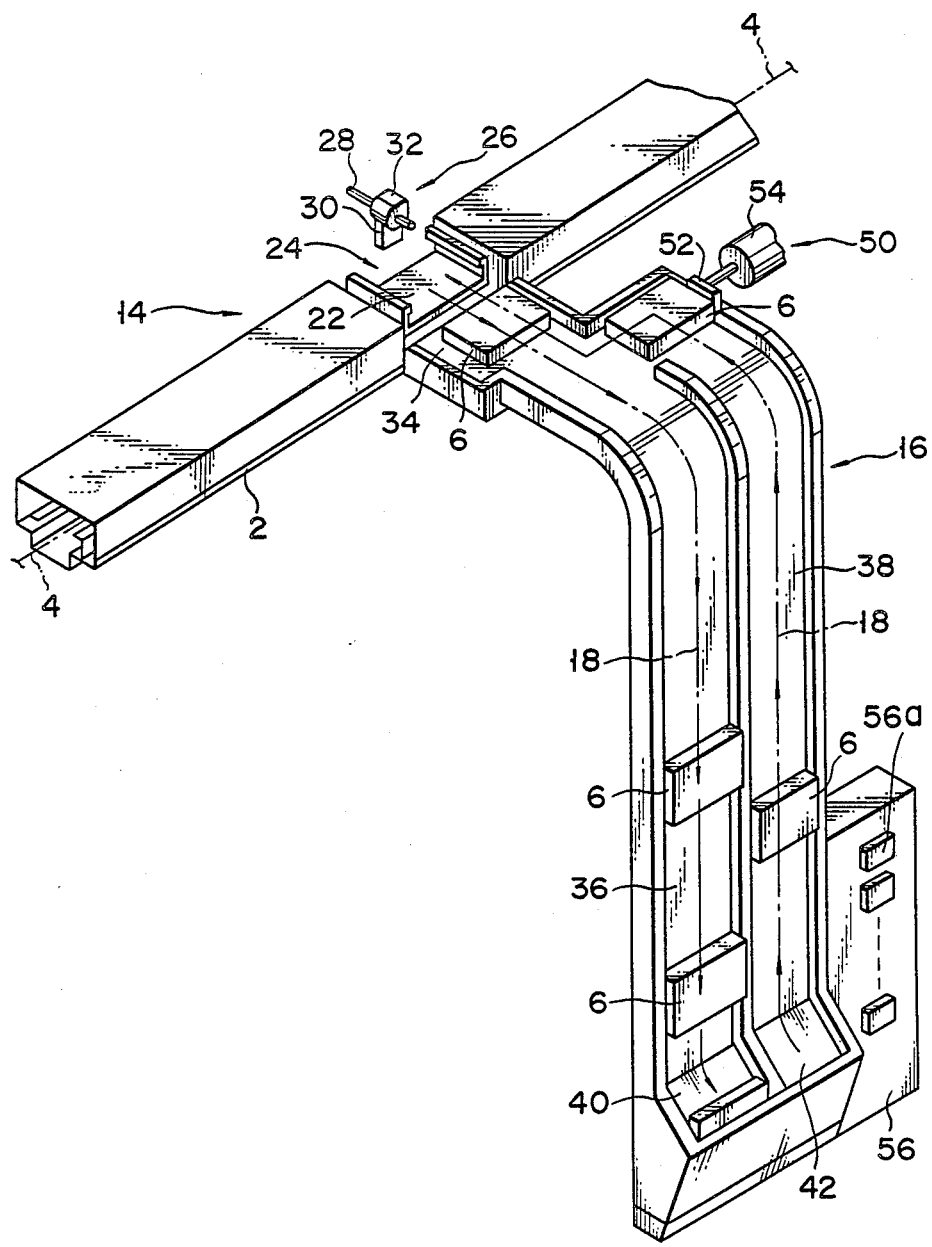
FIG. 4 is a schematic perspective view of part of the main conveying mechanism and the subsidiary conveying mechanism of the same apparatus.

Push mechanism 50 is provided at the end of the conveying portion of belt 49, as can be seen in FIG. 4. Mechanism 50 has push plate 52 which is reciprocated by cylinder 54. Case 6 is pushed from send-out conveying portion 36 to take-in conveying portion 36, by means of mechanism 50. Pushed-out case 6 is supplied to receiving/transferring portion 34, by way of a reversing of the moving direction of belt 46 of take-in conveying portion 36.

Destination input unit 56 having delivery buttons 56a for delivering cases 6 to corresponding destinations, is arranged near case-supply portion 42. When button 56a of unit 56 (which corresponds to a destination of case 6 supplied to case supply-portion 44) is depressed to input the destination, case 6 is sent to a predetermined room 20.

As is shown in FIG. 7, supply portion 42 is provided with weight-detection mechanism 58 for detecting whether case 6, supplied to portion 42, can be conveyed by main conveying mechanism 2. Mechanism 58 has a holding case 60 for holding case 6. Holding case 60 is mounted on pivot shaft 62, and pivots thereabout, within a predetermined range. Case 6 is supplied to holding case 60 when case 60 is at one end of its pivot range (indicated by the solid outline), and is transferred to belt 49, case 60 now being at the other end of its pivot range (indicated by an alternate long and two short dashes outline). Strain gage 64 for detecting the weight of case 6 is mounted on the bottom of holding case 60.

An output from gage 64 is supplied to conveyance control unit 66. Unit 66 includes sample/hold circuit 68, A/D converter 70, I/O terminal 72, microcomputer 74, carrier drive control circuit 76, third pawled conveyor belt-drive-circuit 78, alarm signal generator 80, and case-position sensor 82. Circuit 68 calculates the weight of case 6, in accordance with the output from mechanism 58. A/D converter 70 converts an analog signal output from circuit 68 into a digital signal. I/O terminal 72 connects microcomputer 74 with the respective input/output devices. Microcomputer 74 prestores a conveyable weight corresponding to each distance for each destination. Microcomputer 74 determines whether the weight of case 6, calculated by circuit 68, can be conveyed to the designated destination, and outputs data corresponding to the conveyance energy proportional to the weight, to circuit 76 when the weight is determined as being conveyable. When the weight of case 6, calculated by circuit 68, falls within the predetermined set range, circuit 78 drives belt 49. When the weight of case 6 exceeds the set range, circuit 80 generates an alarm signal. Sensor 82 detects the location of case 6 supplied to receiving/ transferring portion 34.

Figure 8:
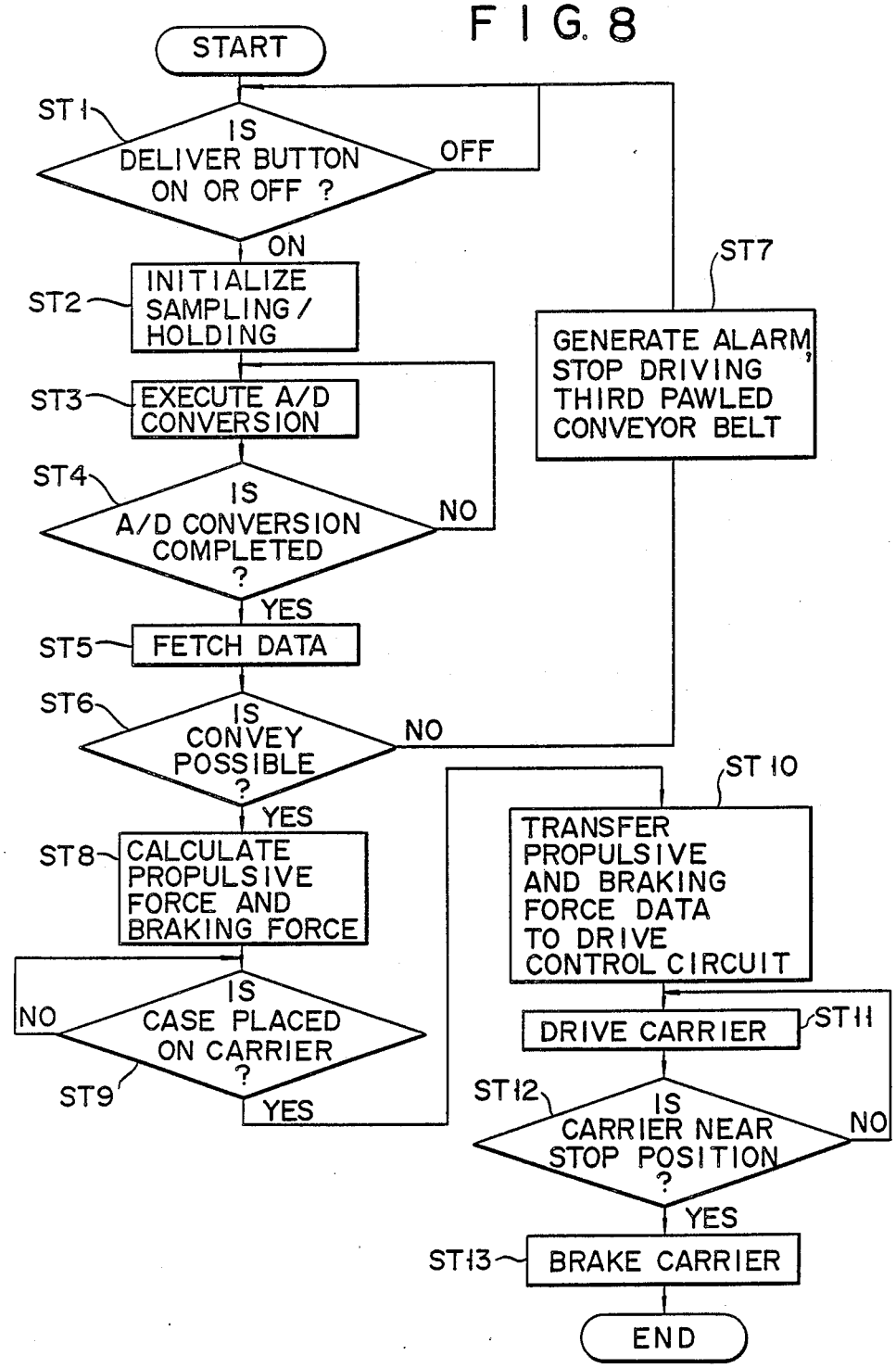
FIG. 8 is a flowchart for explaining the operation of the same apparatus.

The operation of the above arrangement will now be described with reference to FIG. 8.

In a first step (ST1), an object to be delivered to a particular destination is housed in case 6, and is placed on holding case 60 provided at case-supply portion 42 of send-out conveying portion 38. Thereafter, it is determined whether a specified one of delivery buttons 56a of destination input unit 56 has been depressed. If an appropriate button 56a is depressed, the flow advances to a second step (ST2).

In the second step (ST2), an interruption signal is applied to microcomputer 74, by depressing button 56a. Then, an initializing signal is generated by microcomputer 74, and is and supplied to sample/hold circuit 68 via I/O terminal 72. In this way, circuit 68 is initialized, and a weight signal is input from strain gage 64 to circuit 68. Then, the flow advances to a third step (ST3).

In the third step (ST3), the weight signal input to circuit 68 is output to A/D converter 70, where it is converted from an analog signal to a digital signal. Then, the flow advances to a fourth step (ST4).

In the fourth step (ST4), it is determined whether A/D conversion has been completed. If A/D conversion has not been completed, the flow returns to the third step (ST3), and A/D conversion is performed once again. If A/D conversion is then completed, the flow advances to a fifth step (ST5).

In the fifth step (ST5), weight data converted into a digital signal is fetched, as an 8-bit signal, by microcomputer 74 via I/O terminal 72. Then, the flow advances to a sixth step (ST6).

In the sixth step (ST6), it is determined whether data input to microcomputer 74 indicates a weight which can be conveyed to desired destination. If the weight of case 6 exceeds the conveyable range, the flow advances to a seventh step (ST7); if, on the other hand, it falls within the conveyable range, the flow advances to an eighth step (ST8).

In the seventh step (ST7), when case 6 is placed on holding case 60 of case-supply portion 42, a signal is input from microcomputer 74 to alarm signal generator 80 which then generates an alarm. At the same time, a drive-stop signal is supplied from microcomputer 74 to third pawled conveyor belt drive circuit 78. As a result, third pawled conveyor belt 49 is stopped, and case 6 is prevented from being transferred to main conveying mechanism 2. Then, the flow returns to the first step (ST1).

In the eighth step (ST8), a signal for causing microcomputer 74 to drive belt 49 is supplied to circuit 78, and the required propulsive force, as well as the braking force for stopping carrier 24 are calculated, based on data supplied from circuit 68. Then, the flow advances to a ninth step (ST9).

In the ninth step (ST9), it is determined whether the transfer of case 6 to carrier 24 has been detected by case-position sensor 82. If transfer is detected, the flow advances to a tenth step (ST10).

In the tenth step (ST10), a signal for informing of the transfer of case 6 to carrier 24 is input to microcomputer 74. Then, an initializing signal is supplied from microcomputer 74 to carrier drive control circuit 76, and the data of previously calculated propulsive and braking forces are supplied thereto. Then, the flow advances to an eleventh step (ST11).

In the eleventh step (ST11), circuit 76 drives carrier 24 in accordance with the received propulsive force data. Then, the flow advances to a twelfth step (ST12).

In the twelfth step (ST12), it is determined by sensor 82 whether carrier 24 has arrived near its destination. If carrier 24 has not, the flow returns to the eleventh step (ST11). If carrier 24 has, the flow advances to a thirteenth step (ST13).

In the thirteenth step (ST13), a signal is supplied from sensor 82 to circuit 76, and carrier 24 is stopped in accordance with the received braking force data.

With the above arrangement, since the weight of case 6 (which houses the object to be conveyed) is detected before the conveying operation begins, case 6 is not conveyed when the weight of case 6 exceeds a conveyable range. Therefore, unintended stopping or a sizeable deviation from the desired stop position, due to the object being overweight, can be prevented during the course of the conveying operation. In addition, carrier 24 can be accurately and reliably transported to its destination, since conveyance control is performed on the basis of the weight of case 6.

Figure 9:
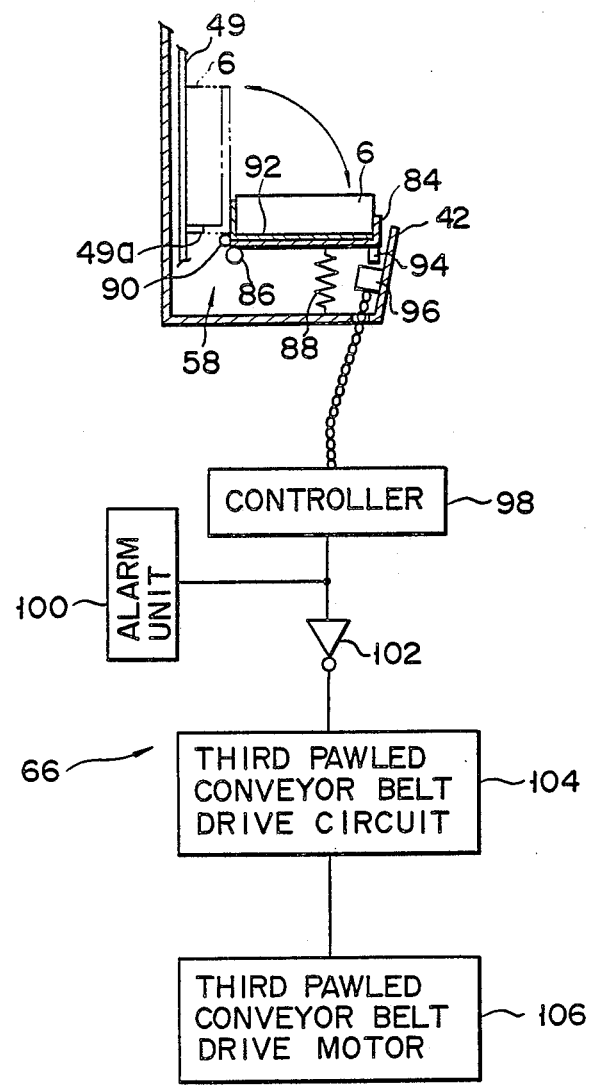
FIG. 9 is a schematic view of a modification of the weight-detection mechanism and the conveyance control unit.

FIG. 9 shows a modification of weight-detection mechanism 58 and conveyance control unit 66. In mechanism 58 according to this modification, case holder 84 is provided near the lower end of third pawled coveyor belt 49. Case holder 84 is supported by support pivot shft 86, so as to be pivotable thereabout. In addition, case holder 84 is supported, in a substantially horizontal state, by spring 88. Holding-case pivot shaft 90 is provided for case holder 84, and is located near shaft 86. Holding case 92, for holding case 6, is fixed to shaft 90. Holding case 92 can be pivoted between the substantially horizontal state, in which it overlaps support 84, and the vertical state, in which it is adjacent to belt 49. Case 6 is supplied to holding case 92 in the substantially horizontal state, and is transferred therefrom to belt 49, by bringing holding case 92 to the vertical state. When case 6 is supplied to holding case 92, support 84 and holding case 92 are moved downward in correspondence with the weight of case 6. Detection piece 94 is mounted on the lower surface of the distal end of support 84. Case-supply portion 42 is provided with sensor 96 for detecting piece 94. Sensor 96 is a well-known optical detector which optically detects piece 94 when support 84 is moved downward to a predetermined position, and outputs its detection signal. On the other hand, conveyance control unit 66, in this modification, includes controller 98, alarm unit 100, inverter 102, and third pawled conveyor belt drive circuit 104. Controller 98 outputs a drive signal in accordance with the detection signal from sensor 96. Unit 100 performs an alarm operation in accordance with the drive signal from controller 98. Circuit 104 drives third pawled conveyor belt drive motor 106 in accordance with the drive signal from controller 98. Inverter 102 inverts the drive signal from controller 98, and supplies it to circuit 104.

A case wherein case 6 containing an article such as a chart or slip is transferred from the medical dept. to the internal dept. will now be described.

First, case 6 having an object therein is supplied onto holding case 92 of case-supply portion 42, so that support 84 is moved downward against the biasing force of spring 88.

Assuming that the length of compressed spring 88 is x and the spring constant is k, the weight (Mg) of case 6 is, therefore, $Mg = kx$.

Assuming that the weight of case 6 which can be conveyed without overrun or an unintended stop on path 4 is $M'g$, length $x'$ of compressed spring 88 is $x' = M'g/k$.

Assume that the distance between detection piece 94 and sensor 96, when case 6 is not placed on holding case 92, is $l_0$, and a distance therebetween, when case 6 is placed holding case 92, is $l_1$. When $l_0 - l_1 \geq x'$, controller 98 outputs "0" signals as drive signals to alarm unit 100 and inverter 102, since sensor 96 does not generate a detection signal. Unit 100 which received the "0" signal does not execute an alarm operation. Inverter 102 which received the "0" signal outputs a "1" signal to third pawled conveyor belt drive circuit 104. Thus, circuit 104 drives belt 49 via conveyor belt drive motor 106. Case 6 is supplied to carrier 24 of mechanism 2 and conveyed on path 4, without any irregularities occurring. When $l_0 - l_1 \geq x'$, controller 98 outputs "1" signals as drive signals to unit 100 and inverter 102, since sensor 96 generates a detection signal. Unit 100 which received the "1" signal executes the alarm operation. Therefore, an operator knows that the weight of case 6 exceeds a set value. Inverter 102 which received the "1" signal outputs a "0" signal to circuit 104. Therefore, circuit 104 does not drive motor 106, and case 6 is not conveyed.

With the above arrangement, the weight of case 6 is detected before it is supplied to path 4 and conveyed. When its weight exceeds a set value, an alarm is generated, and case 6 is not then conveyed to path 4. Excessive weight of a case can thus be detected, and an overrun or unintended stopping of case 6 on path 4, due to the excessive weight, can be prevented.

What is claimed is:

1. A conveying apparatus comprising:
   conveying means for conveying an object, said conveying means having conveying path-defining means for defining a main conveying path of the object and main conveying means for conveying the object along said main conveying path, said main conveying means having a station provided on said main conveying path, a moving body having a storage portion for housing the object and being movable along said main conveying path, and drive means, provided at said station, for moving said moving body;
   detection means for detecting a weight of the object to be conveyed by said conveying means;
   transfer means for transferring the object, the weight of which has been detected by said detection means, to said conveying means, said transfer means including subsidiary conveying path-defining means for defining a subsidiary conveying path of the object extending from said station on said main conveying path, said subsidiary conveying path having an object-transfer portion at the side opposite to said main conveying path, and subsidiary conveying means for conveying the object, the weight of which has been detected by said detecting means, along said subsidiary conveying path, and transferring the object to said main conveying means; and
   control means for controlling the conveying means, to which the object has been transferred by said transfer means, in accordance with the detection result of said detection means, said control means controlling said drive means to supply propulsive and braking forces in correspondence with the weight of the object to said moving body.

2. The apparatus according to claim 1, wherein said control means has a function to control said transfer means to transfer the object to said conveying means, when the weight of the object detected by said detection means falls within a predetermined range, and to control said transfer means not to transfer the object to said conveying means when the weight of the object detected by said detection means falls outside the predetermined range.

3. The apparatus according to claim 1, wherein said control means has a sample/hold circuit for calculating the weight of the object, in accordance with detection data from said detection means, and a microcomputer for controlling a driving force applied to said moving body, in accordance with data proportional to the weight calculated by said sample/hold circuit.

4. The apparatus according to claim 1, wherein said detection means has holding means for holding the object, said holding means being capable of pivoting within a predetermined pivot range, and the object is supplied to said holding means when the holding means is situated at one end of its pivot range, and is transferred from said holding means to said subsidiary conveying means when the holding means is situated at the other end of its pivot range.

5. The apparatus according to claim 1, wherein said detection means is provided at said transfer means.

6. The apparatus according to claim 1, wherein said detection means has a strain gage for detecting the weight of the object.

7. The apparatus according to claim 1, wherein said control means controls a conveying speed of the object, transferred to said conveying means by said transfer means, in accordance with a detection result of said detection means.

8. The apparatus according to claim 1, wherein said detection means has holding means for holding the object, said holding means being displaced in accordance with the weight of the object, and a detection mechanism for detecting displacement of said holding means.

9. The apparatus according to claim 1, wherein said detection mechanism has a detector for optically detecting displacement of said holding means.

10. A conveying apparatus comprising:
    conveying means for conveying an object, said conveying means having conveying path-defining means for defining a main conveying path of the object and main conveying means for conveying the object along said main conveying path, said main conveying means including a plurality of means, arranged along the main conveying path at predetermined intervals, for conveying the object;
    detection means for detecting a weight of the object to be conveyed by said conveying means;
    transfer means for transferring the object, the weight of which has been detected by said detection means, to conveying means, said transfer means including subsidiary conveying path-defining means for defining a subsidiary conveying path of the object extending from said main conveying path, said subsidiary conveying path having an object-transfer portion at the side opposite to said main conveying path, and subsidiary conveying means for conveying the object, the weight of which has been detected by said detecting means, along said subsidiary conveying path, and transferring the object to said main conveying means; and
    control means for controlling the conveying means, to which the object has been transferred by said transfer means, in accordance with the detection result of said detection means, said control means controlling said plurality of conveying means along said main conveying path to supply propulsive and baking forces in correspondence with the weight of the object to control the conveyence of said object.

11. The apparatus according to claim 10, wherein said control means has a function to control said transfer means to transfer the object to said conveying means, when the weight of the object detected by said detection means falls within a predetermined range, and to control said transfer means not to transfer the object to said conveying means when the weight of the object detected by said detection means falls outside the predetermined range.

12. The apparatus according to claim 10, wherein said control means has a sample/hold circuit for calculating the weight of the object, in accordance with detection data from said detection means, and a microcomputer for controlling a driving force applied to said moving body, in accordance with data proportional to the weight calculated by said sample/hold circuit.

13. The apparatus according to claim 10, wherein said detection means has holding means for holding the object, said holding means being capable of pivoting within a predetermined pivot range, and the object is supplied to said holding means when the holding means is situated at one end of its pivot range, and is transferred from said holding means to said subsidiary conveying means when the holding means is situated at the other end of its pivot range.

14. The apparatus according to claim 10, wherein said detection means is provided at said transfer means.

15. The apparatus according to claim 10, wherein said detection means has a strain gage for detecting the weight of the object.

16. The apparatus according to claim 10, wherein said control means controls a conveying speed of the object, transferred to said conveying means by said transfer means, in accordance with a detection result of said detection means.

17. The apparatus according to claim 10, wherein said detection means has holding means for holding the object, said holding means being displaced in accordance with the weight of the object, and a detection mechanism for detecting displacement of said holding means.

18. The apparatus according to claim 10, wherein said detection mechanism has a detector for optically detecting displacement of said holding means.

* * * * *